(12) United States Patent  (10) Patent No.: US 8,277,345 B2
Chung  (45) Date of Patent: Oct. 2, 2012

(54) STEPLESS TRANSMITTING AND SPEED VARYING STRUCTURE

(76) Inventor: Chih-Hao Chung, Taichung (TW)

( * ) Notice: Subject to any disclaimer, the term of this patent is extended or adjusted under 35 U.S.C. 154(b) by 145 days.

(21) Appl. No.: 12/836,698

(22) Filed: Jul. 15, 2010

(65) Prior Publication Data

US 2012/0015767 A1 Jan. 19, 2012

(51) Int. Cl.
*F16H 55/56* (2006.01)
(52) U.S. Cl. .......................................... 474/14
(58) Field of Classification Search .............. 474/13, 474/14, 15, 23, 24, 31, 32, 49, 50, 58
See application file for complete search history.

(56) References Cited

U.S. PATENT DOCUMENTS

| | | | | |
|---|---|---|---|---|
| 4,589,858 A * | 5/1986 | Gaddi | .............. | 474/12 |
| 4,976,657 A * | 12/1990 | Takano | .............. | 474/13 |
| 5,514,040 A * | 5/1996 | Robert | .............. | 474/13 |
| 5,597,060 A * | 1/1997 | Huddleston et al. | ...... | 192/105 C |
| 5,647,810 A * | 7/1997 | Huddleston | .............. | 474/14 |
| 6,309,317 B1 * | 10/2001 | Joss | .............. | 474/13 |
| 6,962,543 B2 * | 11/2005 | Roby | .............. | 474/39 |
| 7,163,477 B1 * | 1/2007 | Sherrod | .............. | 474/14 |
| 7,204,771 B2 * | 4/2007 | Gu et al. | .............. | 474/19 |
| 7,217,204 B2 * | 5/2007 | Roby | .............. | 474/14 |
| 7,276,004 B2 * | 10/2007 | Wu et al. | .............. | 474/13 |

* cited by examiner

*Primary Examiner* — Michael Mansen
*Assistant Examiner* — Mark K Buse
(74) *Attorney, Agent, or Firm* — Alan Kamrath; Kamrath IP Lawfirm, PA

(57) ABSTRACT

A stepless transmitting and speed-varying structure contains a power mechanism to drive a first transmission shaft by using power. The first transmission shaft is connected with a set of disk members including fixed and movable discs. A transmitting mechanism includes a belt disposed on the disk members, with one end of the belt connected with an intermediate speed-varying stem coaxial with a transmitting member to actuate a second transmission shaft. The second transmission shaft includes a resilient member, with one end of the resilient member coupled with the intermediate speed-varying stem and with another end thereof connected with a fixed member. A speed varying mechanism includes the second transmission shaft connected with a variable speed member, an actuated member, and plural eccentric blocks. The variable speed member couples with a connecting rod, with one end of the connecting rod joined with the movable disc.

3 Claims, 5 Drawing Sheets

STEPLESS TRANSMITTING AND SPEED VARYING STRUCTURE

BACKGROUND OF THE INVENTION

1. Field of the Invention

The present invention relates to a stepless transmitting and speed-varying structure and more particularly, to a stepless transmitting and speed-varying structure capable of changing speed in a force and time saving manner.

2. Description of the Prior Art

A conventional transmitting and speed-varying structure includes a speed varying mechanism to change speed at a highest level to lower a rotating torque, thus accelerating speed, or at a lowest level to enhance the rotating torque, however lowering power and increasing torque.

The present invention has arisen to mitigate and/or obviate the afore-described disadvantages.

SUMMARY OF THE INVENTION

The primary objective of the present invention is to provide a stepless transmitting and speed-varying structure that power energy changes its speed automatically and steplessly based on power to shift easily and smoothly.

To obtain the above objective, a stepless transmitting and speed-varying structure provided by the present invention contains:

a power mechanism driving a first transmission shaft by using power, with the first transmission shaft connected with a set of disk members, and with the set of disk members including a fixed disc and a movable disc;

a transmitting mechanism including a belt disposed on the disk member, with one end of the belt connected with an intermediate speed-varying stem, with the intermediate speed-varying stem coaxial with a transmitting member used to actuate a second transmission shaft, with the second transmission shaft including a resilient member fitted thereon, with one end of the resilient member coupled with the intermediate speed-varying stem, and with another end thereof connected with a fixed member; and a speed varying mechanism including the second transmission shaft connected with a variable speed member and an actuated member and including a plurality of eccentric blocks mounted around a peripheral side thereof to move relative to the variable speed member, with the variable speed member coupling with a connecting rod, and with one end of the connecting rod joined with the movable disc of the set of disk members.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
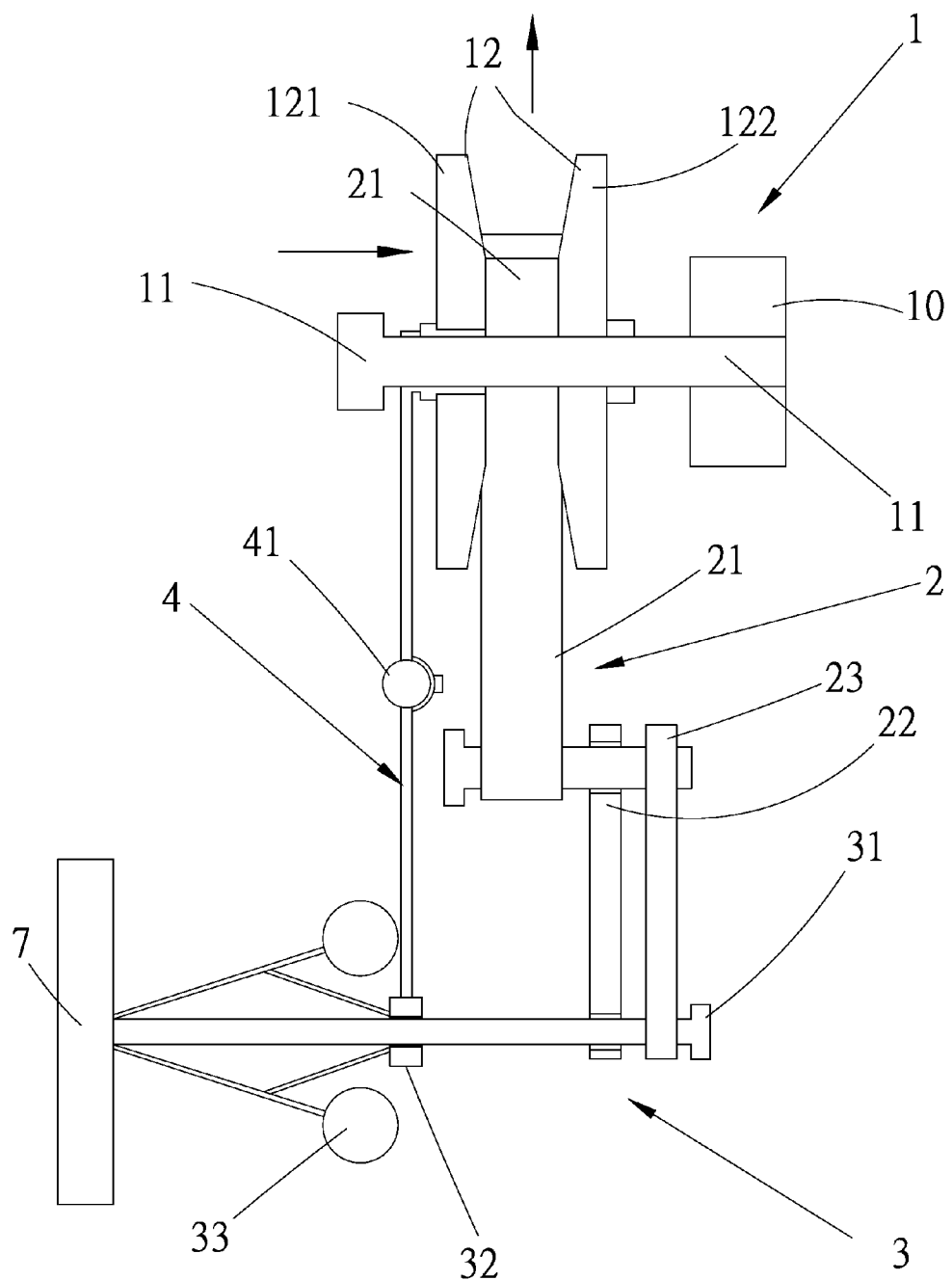
FIG. 1 is a plan view showing the assembly of a stepless transmitting and speed-varying structure according to a preferred embodiment of the present invention.
Figure 2:
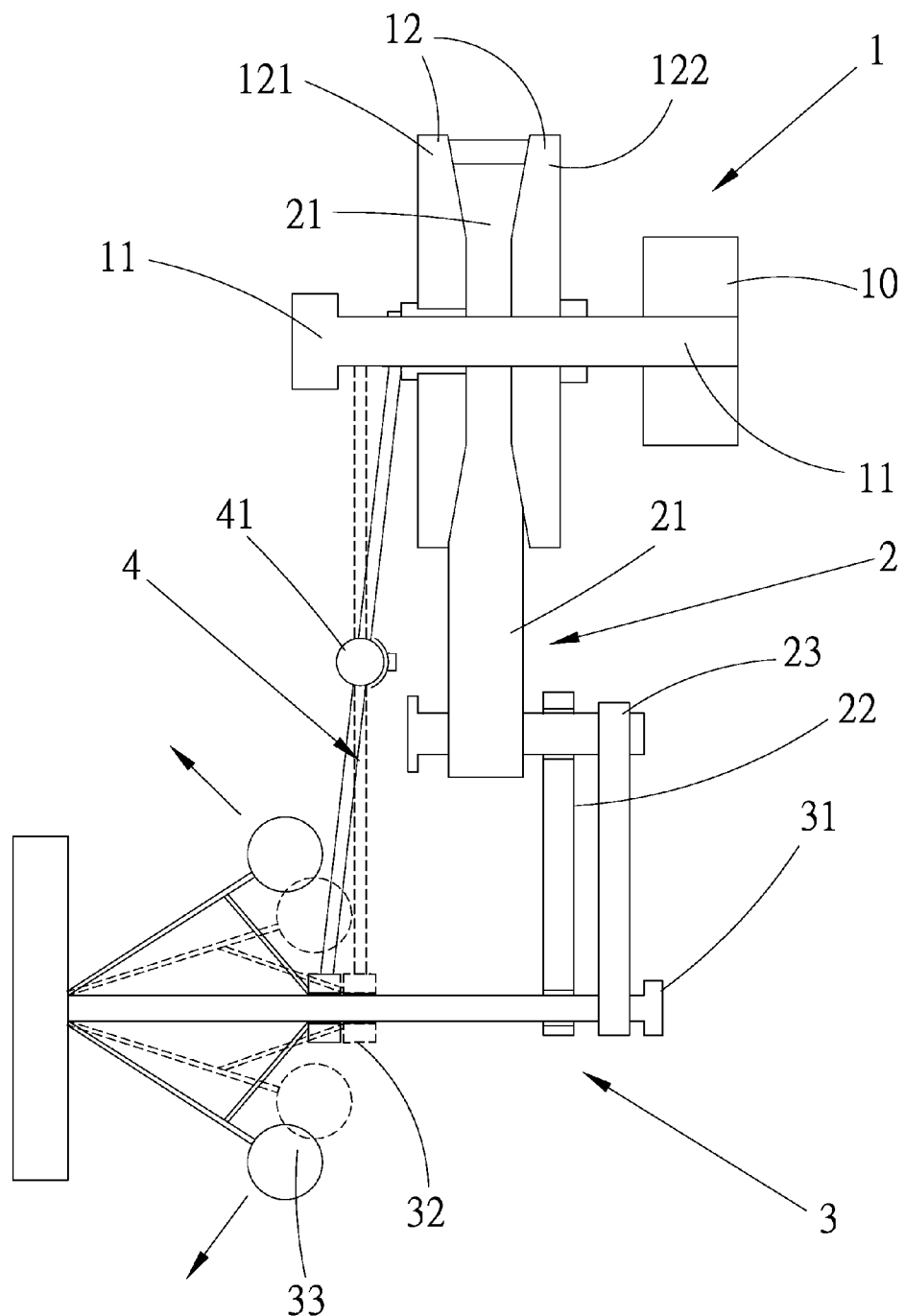
FIG. 2 is another plan view showing the assembly of the stepless transmitting and speed-varying structure according to the preferred embodiment of the present invention.
Figure 3:
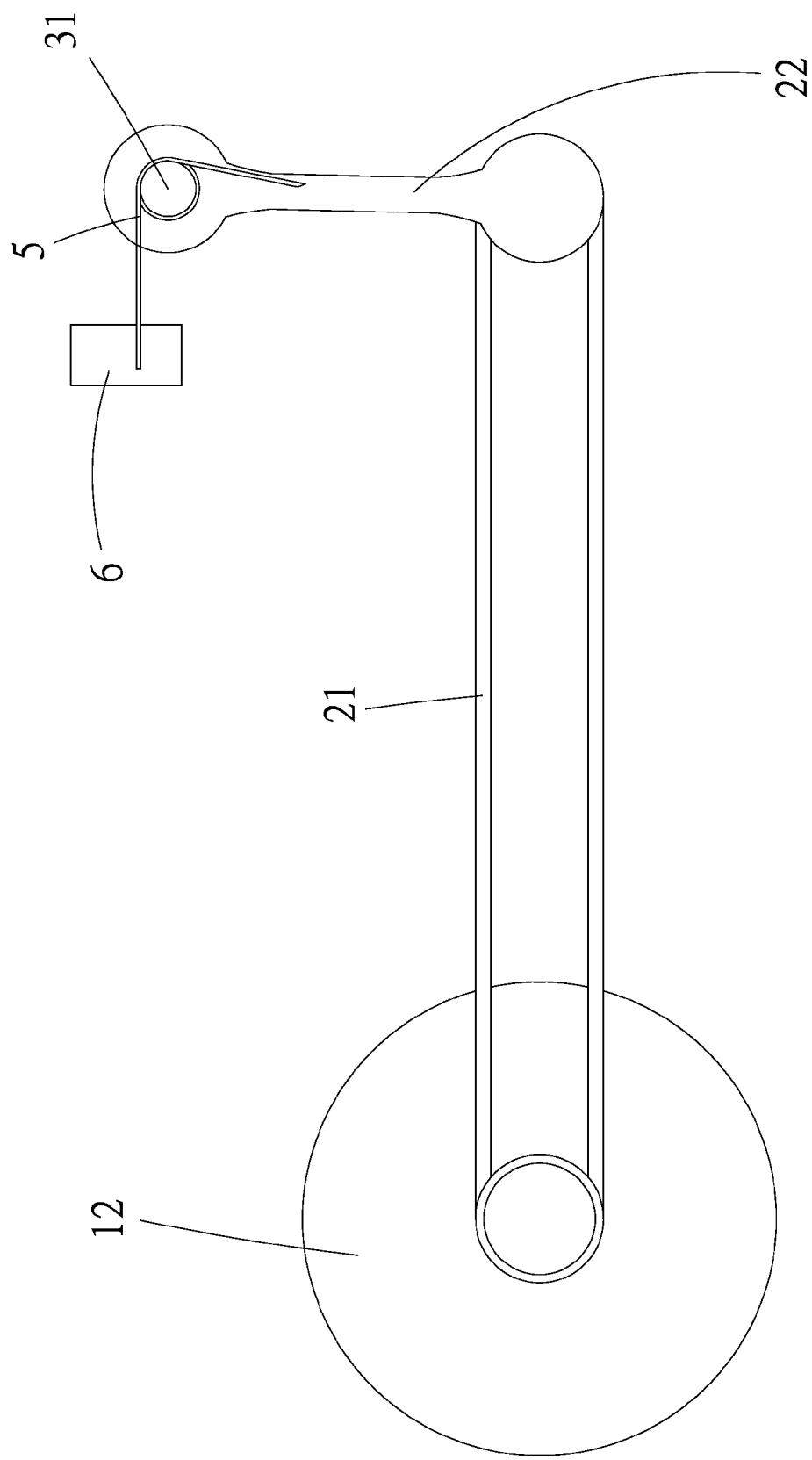
FIG. 3 is a plan view showing the assembly of an intermediate speed-varying stem of the stepless transmitting and speed-varying structure according to the preferred embodiment of the present invention.
Figure 4:
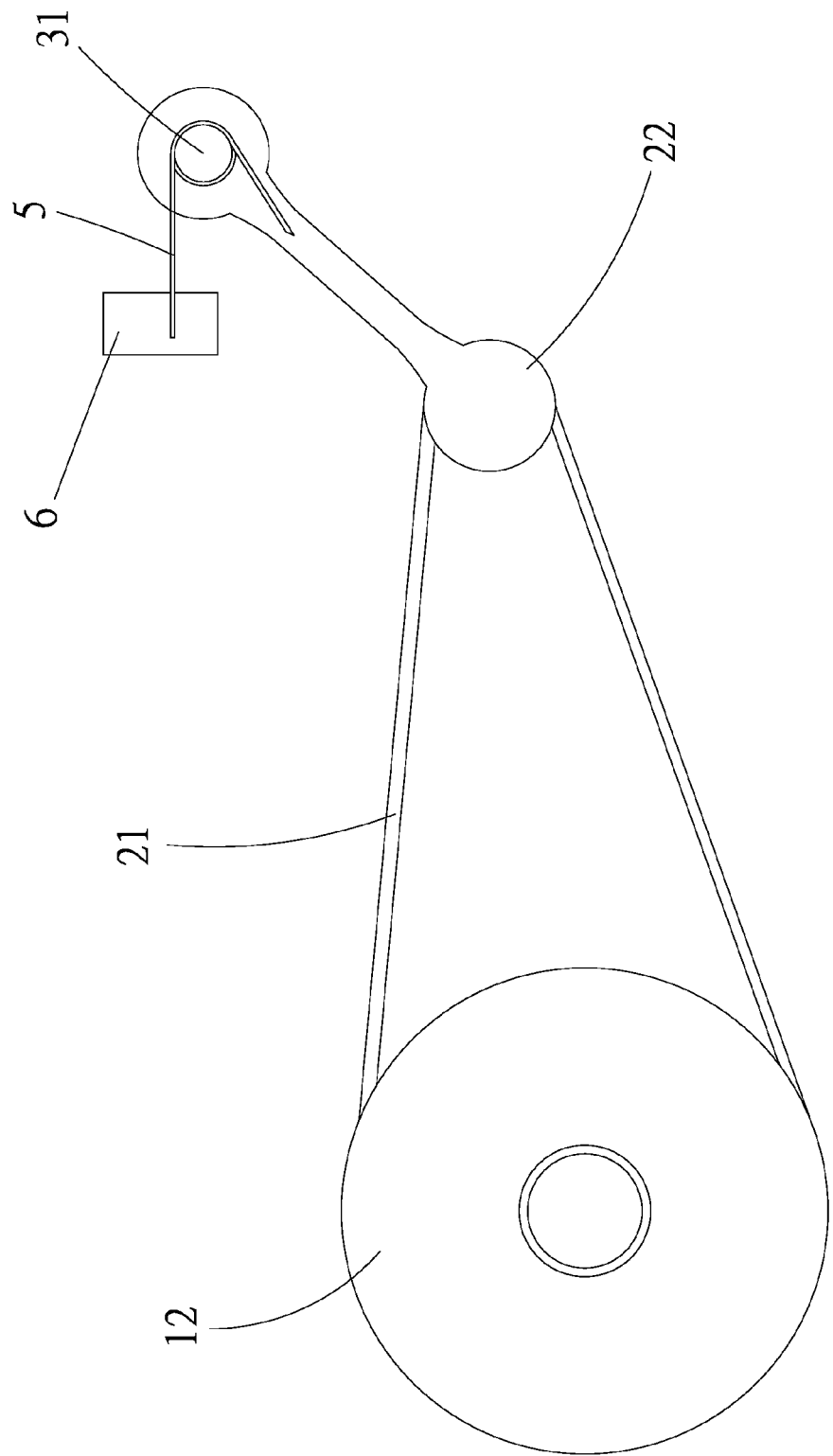
FIG. 4 is another plan view showing the assembly of the intermediate speed-varying stem of the stepless transmitting and speed-varying structure according to the preferred embodiment of the present invention.
Figure 5:
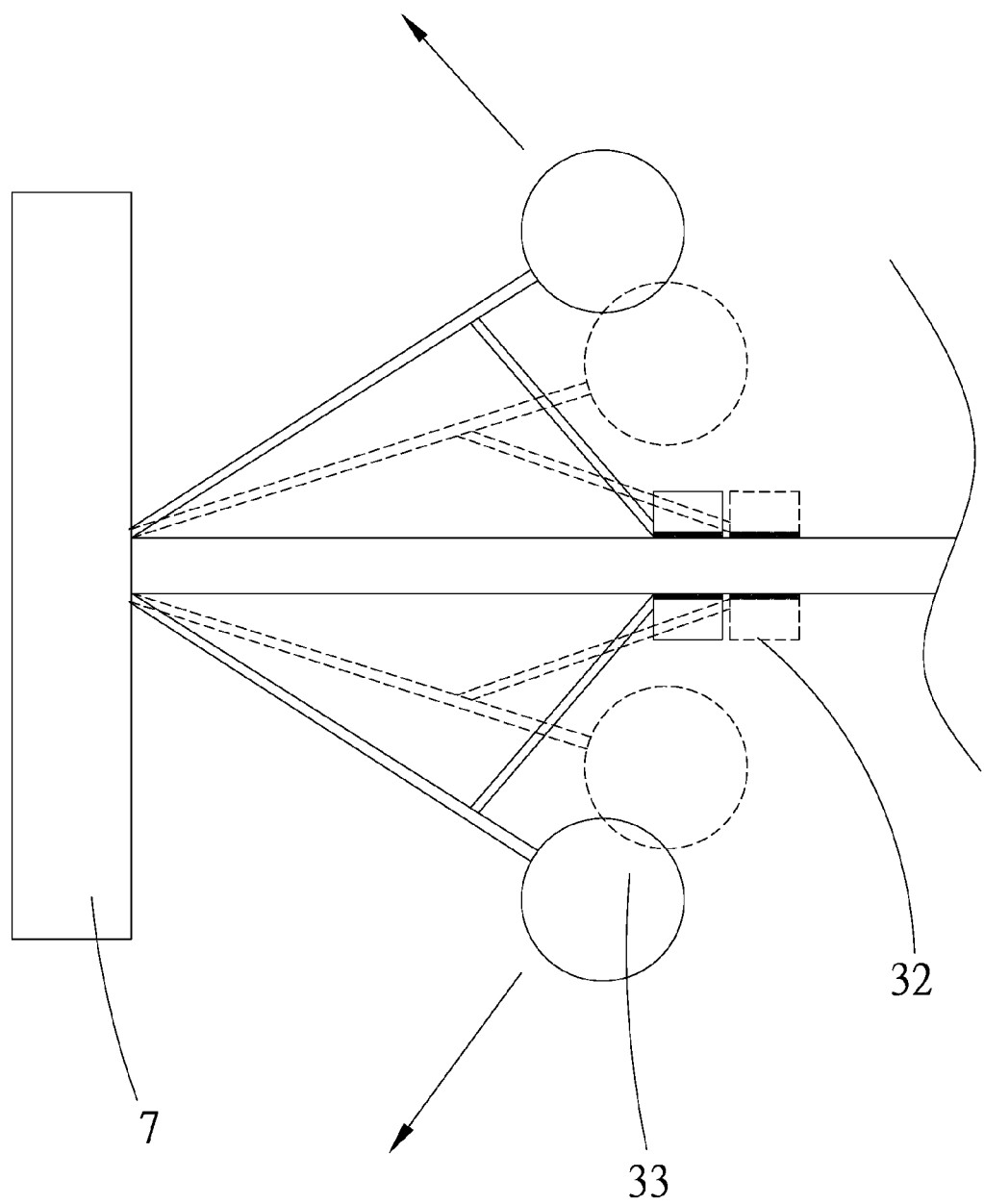
FIG. 5 is a plan view showing the operation of a speed varying mechanism of the stepless transmitting and speed-varying structure according to the preferred embodiment of the present invention.

Referring to FIGS. 1-5, a stepless transmitting and speed-varying structure in accordance with a preferred embodiment of the present invention comprises a power mechanism 1, a transmitting mechanism 2, and a speed varying mechanism 3.

The power mechanism 1 drives a first transmission shaft 11 by using power 10. The first transmission shaft 11 is connected with a set of disk members 12 to transmit the disk members 12. The set of disk members 12 includes a fixed disc 122 and a movable disc 121, and the movable disc 121 is coupled with a connecting rod 4.

The transmitting mechanism 2 includes a belt 21 disposed on the disk members 12 and actuated by the disk members 12. One end of the belt 21 is connected with an intermediate speed-varying stem 22, and the intermediate speed-varying stem 22 is coaxial with a transmitting member 23 used to actuate a second transmission shaft 31. Thus, when the belt 21 expands and retracts to actuate the intermediate speed-varying stem 22, the intermediate speed-varying stem 22 displaces within a certain range. The second transmission shaft 31 includes a resilient member 5 fitted thereon. One end of the resilient member 5 is coupled with the intermediate speed-varying stem 22, and another end thereof is connected with a fixed member 6. The resilient member 5 is capable of pulling the intermediate speed-varying stem 22 so that the intermediate speed-varying stem 22 forces the transmitting member 23 to connect and actuate the belt 21.

The speed varying mechanism 3 includes the second transmission shaft 31 connected with a variable speed member 32 and an actuated member 7. The variable speed member 32 slides along the second transmission shaft 31 and includes a plurality of eccentric blocks 33 mounted around a peripheral side thereof to move relative to the variable speed member 32. The variable speed member 32 couples with the connecting rod 4. One end of the connecting rod 4 is joined with the movable disc 121 of the disk members 12.

When the power 10 starts transmission, the second transmission shaft 31 and the actuated member 7 are actuated by using the first transmission shaft 11, the disc members 12, the belt 21, and the transmitting member 23. When the second transmission shaft 31 rotates, the variable speed member 32 is actuated by the second transmission shaft 31 to rotate, and the eccentric block 33 rotates outward because of a centrifugal force to change a speed of the variable speed member 32. The connecting rod 4 connects with the second transmission shaft 31 and includes a support member 41 serving as a central fulcrum point of the connecting rod 4. Hence, the connecting rod 4 becomes a scale so that when the variable speed member 32 pulls and pushes the connecting rod 4, another end of the connecting rod 4 pushes the movable disc 121 of the disc members 12. Therefore, the movable disc 121 presses the fixed disc 122 so that a distance of the disc members 12 decreases, and a diameter of the belt 21 increases to pull the intermediate speed-varying stem 22. Thus, the transmitting member 23 rotates quickly, thereby accelerating the stepless transmitting and speed-varying structure.

When the power 10 is decreased, a centrifugal force of the eccentric block 33 of the variable speed member 32 decreases so that the variable speed member 32 rolls inward, and the connecting rod 4 moves inward as well to release the movable disc 121 of the disk members 12 so that the movable disc 121 moves outward. The distance of the disk members 12 increases so that the belt 21 moves toward an axial center. Hence, the diameter of the belt 21 decreases, and a rotating speed of the transmitting member 23 slows, thereby decelerating the stepless transmitting and speed-varying structure.

The resilient member 5 is fitted on the second transmission shaft 31. The one end of the resilient member 5 is coupled with the intermediate speed-varying stem 22, and another end thereof is connected with the fixed member 6. Besides, the resilient member 5 is capable of pulling the intermediate speed-varying stem 22 so that the transmitting member 23 is actuated to connect with the belt 21 tightly.

Thereby, when the distance of the disk members 12 decreases, the belt 21 moves outward from the axial center to increase its diameter, and the intermediate speed-varying stem 22 moves toward the disk members 12 to increase a distance between the intermediate speed-varying stem 22 and the disk members 12. The diameter of the belt 21 increases to accelerate rotating speed. Yet, when the distance of the disk members 12 increases, the belt 21 moves inward to decrease its diameter, and the intermediate speed-varying stem 22 moves away from the disk members 12 to increase the distance between the intermediate speed-varying stem 22 and the disk members 12. The diameter of the belt 21 decreases to decelerate the rotating speed.

While various embodiments in accordance with the present invention have been shown and described, it is clear to those skilled in the art that further embodiments may be made without departing from the scope of the present invention.

What is claimed is:

1. A stepless transmitting and speed-varying structure comprising:
   a power mechanism driving a first transmission shaft, with the first transmission shaft connected with a set of disk members, with the set of disk members including a fixed disc and a movable disc;
   a transmitting mechanism including a belt disposed on the set of disk members, with one end of the belt connected with an intermediate speed-varying stem, with the intermediate speed-varying stem being coaxial with a transmitting member moving a second transmission shaft, with the second transmission shaft including a resilient member, with one end of the resilient member coupled with the intermediate speed-varying stem and with another end of the resilient member connected with a fixed member; and
   a speed varying mechanism including the second transmission shaft connected with a variable speed member and an actuated member and including a plurality of eccentric blocks mounted around a peripheral side of the variable speed member and moveable relative to the variable speed member, with the variable speed member coupling with a connecting rod, with one end of the connecting rod joined with the movable disc of the set of disk members.

2. The stepless transmitting and speed-varying structure as claimed in claim 1, wherein the resilient member pulls the intermediate speed-varying stem forcing the transmitting member to connect and actuate the belt.

3. The stepless transmitting and speed-varying structure as claimed in claim 1, wherein the connecting rod includes a support member serving as a central fulcrum point of the connecting rod, and wherein when the variable speed member pulls and pushes the connecting rod, another end of the connecting rod pushes the movable disc of the set of disc members.

* * * * *